United States Patent [19]

Zlamal

[11] Patent Number: 4,914,954
[45] Date of Patent: Apr. 10, 1990

[54] CONTROL DEVICE

[75] Inventor: Vlastimil Zlamal, Regensburg, Fed. Rep. of Germany

[73] Assignee: Siemens Aktiengesellschaft, Berlin and Munich, Fed. Rep. of Germany

[21] Appl. No.: 248,115

[22] Filed: Sep. 23, 1988

[30] Foreign Application Priority Data

Sep. 24, 1987 [DE] Fed. Rep. of Germany ....... 3732192

[51] Int. Cl.⁴ ............................................. G01L 19/14
[52] U.S. Cl. ........................................ 73/756; 73/431
[58] Field of Search ................................... 73/756, 431

[56] References Cited

U.S. PATENT DOCUMENTS

| 4,176,557 | 12/1979 | Johnston | 73/756 X |
| 4,414,851 | 11/1983 | Maglic | 73/756 X |
| 4,557,225 | 12/1985 | Sagues et al. | |
| 4,759,216 | 7/1988 | Carpenter et al. | 73/431 X |

Primary Examiner—Charles A. Ruehl
Attorney, Agent, or Firm—Hill, Van Santen, Steadman & Simpson

[57] ABSTRACT

A housing of a control device includes a printed circuit board having an electrical equilization element. A retaining part fixes a pressure sensor in the housing so that the pressure sensor does not contact the printed circuit board and so that access to the electrical equilization element remains free, at least before portions of the housing are connected.

6 Claims, 2 Drawing Sheets

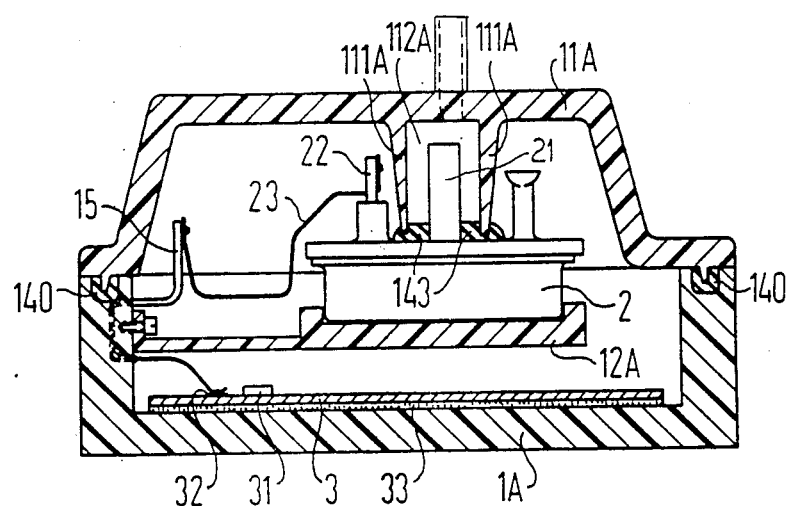

CONTROL DEVICE

BACKGROUND OF THE INVENTION

1. Field of the Invention

The present invention is directed generally to a control device and more particularly to a control device for a motor vehicle including a pressure tight housing surrounding a pressure sensor and a printed circuit board.

2. DESCRIPTION OF THE RELATED ART

A control device is disclosed, for example, in German Patent No. 30 13 760. As shown therein, the pressure sensor has a pressure pick-up element which is secured in or on a printed circuit board. The pressure pick-up element is covered by a connecting funnel on the circuit board and must be sealed from the environment. The printed circuit board and the parts thereon can be damaged by this connection. Moreover, the connecting funnel must project out of the housing of the control mechanism for connection to a pressure hose. However, vibrations which occur due to the relatively rough operation of an internal combustion motor are transmitted from the housing directly to the pressure sensitive circuit board.

A pressure sensor which includes a pressure pick-up element and a sealed connecting funnel inverted thereover also requires a great deal of space on a printed circuit board. The printed circuit board and the housing in which it is mounted must accordingly be relatively large, which runs contrary to the increasing tendency for smaller and more compact elements.

A further problem in the prior art is that the chacteristic, or response curve, of the pressure sensor requires equalization. To this end, access must be provided to the electrical terminals of the pressure sensor in the completely assembled pressure sensor to be able to connect or adjust an appropriate equilization means. At the same time, however, the equilization elements which are already on the printed circuit board must also be accessible so that the pressure characteristic can be adjusted by adjustment of the equilization elements.

A solution to this problem is to provide the electrical terminals of the pressure sensor conducted to the outside of the housing. During production, the equilization means is capable of being easily connected to the external connections instead of being connected to the sensitive printed circuit board. This also facilitates access to the equilization elements on the printed circuit board within the housing However, connecting the terminals to the outside of the housing adds an additional cost factor since outside terminals must be incased after the equilization adjustment to avoid corrosion.

SUMMARY OF THE INVENTION

An object of the present invention is to provide a control device having a pressure sensor which overcomes the disadvantages of the prior art. In particular, the equilization adjustment of the pressure sensor of the present invention is particularly simple during production and an extremely compact format for the control device is nonetheless achieved.

According to the principles of the present invention, the problems are solved by a control device having a pressure sensor fixed in a lower part of a housing at a distance from the printed circuit board by a retaining par so that the equilization element is freely accessible when an upper part of the housing is removed.

Advantageous developments of the invention are characterized by the control device having a retaining part with an upwardly arched portion for accepting the pressure sensor, the upperly arched portion being open toward the circuit board and having a clearance for a pressure connection of the pressure sensor. The pressure sensor is held in the upwardly arched portion by a retaining member which is snap connected in the retaining part. Seating webs are provided in the lower part of the housing on which the retaining part rests. Guide means are provided between the pressure sensor and the retaining part as well as between the retaining part and the lower part so that the position of the parts relative to one another is fixed by the guide means.

A pressure space into which a connection discharges from the outside and into which a pressure connection of the pressure sensor discharges from the inside lies between the upper part and the retaining part. The pressure space is limited by the outside walls of the upwardly arched portion of the retaining part and by walls within the upper part that project into a seal in a channel and the retaining part that surrounds the upwardly arched portion for the pressure sensor. The pressure sensor lies on the retaining part and is pressed against the retaining part by the upper part in one embodiment. In another embodiment, the retaining part is cast or molded as part of the lower part. Alternately, the retaining part is connected to the lower part.

The basic idea of the invention is to use a commercially available, completely assembled sensor with its own housing as a pressure sensor and to incorporate this pressure sensor into a housing of a control device so that it does not touch the printed circuit board. A retaining part which is fixed in the housing and accepts the pressure sensor is provided for this purpose. The retaining part is designed and arranged so that access to equilization elements on the printed circuit board remains possible.

The printed circuit board and the housing in which it is accepted can be constructed far smaller than in the prior art devices since the space required for the pressure sensor on the printed circuit board is eliminated. Problems due to potential damage of the circuit board during mounting of the pressure sensor are also eliminated.

BRIEF DESCRIPTION OF THE DRAWINGS

FIG. 3 is a cross section generally in the same direction as FIG. 1 through a second embodiment of a control device of the invention.

DESCRIPTION OF THE PREFERRED EMBODIMENTS

Figure 1:
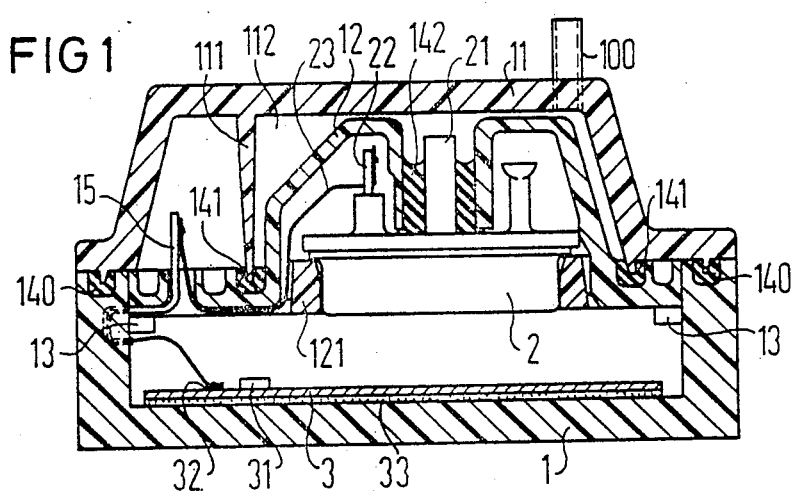
FIG. 1 shows a cross section generally along line I—I of FIG. 2 through a control device according to the principles of the present invention.
Figure 2:
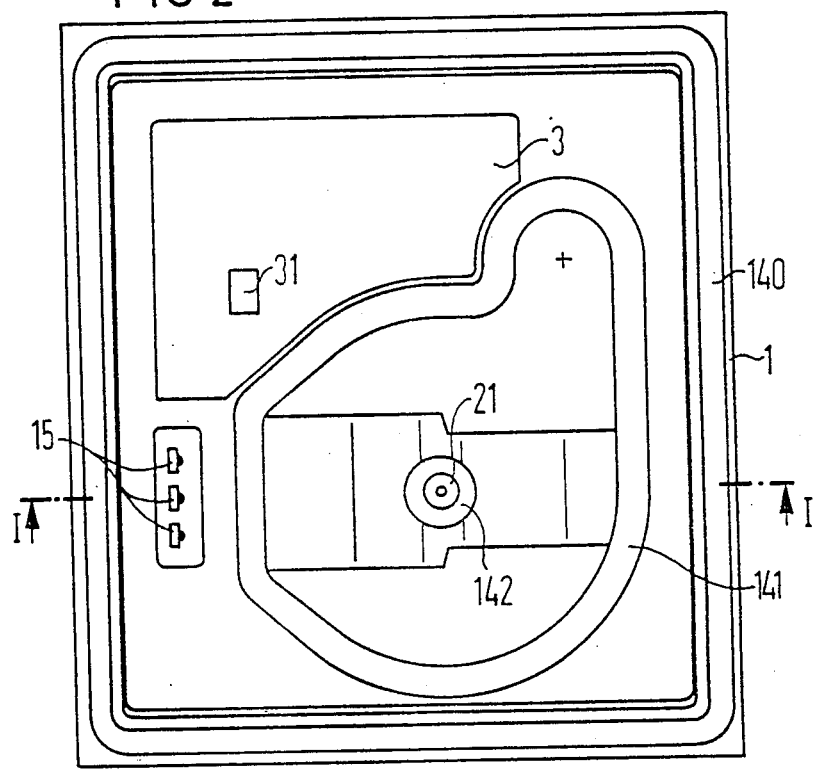
FIG. 2 is a plan view of the control device of FIG. 1 showing a lower, housing part with an upper housing part removed.

FIGS. 1 and 2 show a control device including a housing which surrounds an interior space in pressure tight fashion. The housing is formed by a lower part 1 and an upper part 11. The lower part 1 is generally rectangular in shape and has an upwardly open trough configuration in which a printed circuit board 3 is connected to the floor of the lower part by a heat conducting adhesive layer 33. In the FIGURES, the lower part is shown as a one-piece plastic part. Alternate embodiments of the invention can include a metal floor in the lower part to improve heat elimination from the circuit board. In this alternate embodiment, the lower part has plastic side walls formed around the metal floor in a known way.

The printed circuit board includes a thick-film circuit in which the electrical circuit has various component parts and connections, among which is an electrical equalization element 31. The printed circuit board 3 also includes board contacts 32 by which the printed circuit board 3 is electrically connected. Although other elements and contacts may be provided on the printed circuit board for the control device depending upon the particular circuitry and arrangement thereof, the illustration of the present application only shows the element 31 and the contacts 32 for the sake of simplicity. The board contacts 32 are connected to interconnects which are cast into the lower part 1 to provide electrical connections, for example, to outside plugs (not shown). In the illustrated example, one of the board contacts 32 is shown including a portion in broken outline cast into the lower part 1 to provide a connection to one of three housing contacts 15 which provides electrical connection to a pressure sensor 2.

The pressure sensor 2 of the illustrated embodiment is a commercially available component part obtainable under the part designation EP 3445 from the Fuji company. The pressure sensor is not shown in section in FIG. 1, nor are details of the internal parts shown. The pressure sensor 2 includes a cylindrical pressure connection 21 with a central pressure admitting bore. The pressure admitting bore discharges into a circular load cell whose contour is shown in FIG. 1. The load cell includes a pressure-sensitive element and means for converting the pressure into electrical signals which are available at three electrical terminals 22.

The pressure sensor 2 is fixed in the lower part 1 by a retaining part 12. The retaining part 12 forms a type of intermediate seal which fits exactly into the opening of the lower part and which rests on seating webs 13 shown extending from the side walls of the lower part 1. The retaining part 12 includes an arched hood-like portion for accepting the pressure sensor 2; the arched hood-like portion having a circular recess surrounding the pressure connection 21. A retaining member 121 is provided angularly surrounding the pressure sensor 2 to hold the pressure sensor 2 in the hood-like arched portion of the retaining part 12. Although many different types of retaining means may be used to hold the retaining member 121 to the retaining part 12, the preferred embodiment of the retaining member 121 has two retaining noses or ramps (not shown) which snap into and engage the retaining part 12.

Referring to FIG. 2 in which the upper part 11 is removed, the retaining part 12 has an opening or recess through which is visible the printed circuit board 3 and which admits access to the electrical equilization element 31 situated thereon even when the retaining part 12 is in place. As can be seen in both FIGS. 1 and 2, an additional opening or recess in the retaining part 12 is provided through which extends the three electrical contacts 15. The electrical connection to the three contacts 15 is provided by three sheet metal strips 23 adapted in shape to the shape of the retaining part 12 and projecting through the recess for the contacts 15. The opposite ends of the three sheet metal strips 23 are connected to the electrical terminals 22 of the pressure sensor 2.

The upper part 11 shown in FIG. 1 seals the lower part 1 from the environment in pressure-tight fashion with the assistance of a seal 140. The seal 140 lies in an endless recess, or channel, in an upper edge of a wall of the lower part 1 which is directed toward the upper part 11. The seal 140 which can be of rubber or adhesive or the like is enhanced by a narrow ridge extending from the upper part 11 into the endless recess or channel of the seal 140.

A wall 111 in the upper part 11 separates a pressure space 112 from the interior of the housing. The pressure space 112 is sealed relative to the interior of the housing by additional seals 141 and 142. The wall 111 presses into the additional seal 141 as shown in FIG. 1. The seal 141 extends around the arched hood-like portion of the retaining part 12, as can be seen in FIG. 2. The inside wall 111 thus forms a type of hood together with a part of the upper part 11 above the pressure connection 21 of the pressure sensor 2. The further seal 142 is a sealing compound which surrounds the pressure connection 21 and seals the pressure space 112 from the sensor housing.

The upper part 11 of the housing includes a connection 100 of the type of which is well known for connecting a pressure hose coming from the outside to the upper part 11. The connection is situated above the location identified with a cross in FIG. 2. The pressure hose connection on the upper part 11 and the pressure connection 21 of the pressure sensor 2 are thus offset relative to one another. The pressure space 112, thus, forms a type of labyrinth which prevents contaminates and condensed water which are admitted through the pressure hose from proceeding directly to the pressure sensor. The pressure space 112 also buffers sudden pressure surges.

The method of assemblying the control device of the invention begins with the lower part 1 and the electrically connected circuit board 3 mounted therein. The assembly sequence continues as the sheet metal strips 23 are welded to the electrical terminals 22 of the pressure sensor 2 and are inserted into the retaining part 12 together with the pressure sensor 2. The pressure sensor 2 and the sheet metal strips 23 are fixed in the retaining part 12 by the retaining member 121. The shape of the arched portion of the retaining part 12 allows the pressure sensor to be inserted only in the position in FIG. 1. In cooperation with the shaping of the sheet metal strips 23, it is thus guaranteed that the strips project through the recess provided in the retaining part 12.

The retaining part 12 is placed into the opening of the lower part 1. The retaining part 12 can only be introduced in proper alignment since the arrangement of the contacts 15 at the lower part and the appertaining recess of the retaining part 12 do not permit a skewed insertion. An inadvertent insertion with the arched portion at the bottom is also not possible since this would rest against the printed circuit board 3 and the retaining part 12 could not assume a defined position. The position of the pressure sensor 2, the retaining part 12, and the lower part 1 are thus unmistakably defined relative to one another.

The sheet metal strips 23 are already nondisplaceably allocated to the contacts 15 and a[e welded thereto. The equilization of the pressure sensor 2 is carried out through the recess in the retaining part 12 allocated to the electrical equilization element 31. The sealing compound for the seals 140, 141 and 142 is applied in a single work cycle. The upper part 11 is then put in place and secured with screws (not shown), although other fastening means can be used as well.

A second embodiment of the present invention is shown in FIG. 3 which includes a modification of the inventively constructed control device. The parts thereof which remain unchanged in comparison to FIGS. 1 and 2 are provided with the same reference characters The embodiment of FIG. 3 differs from the exemplary embodiment of FIG. 1 in that a different retaining part 12A in the form of a plate is used, the retaining part 12A resting against the pressure sensor 2. The retaining part 12A is secured to a lower part 1A. The shape of the retaining part 12A is limited only by the need to guarantee access to the electrical equilization element 31 and the need for seating the pressure sensor 2. The fastening of the retaining part 12A in the lower part 1A can also be arbitrarily selected. For example, the retaining part 12A can be directly cast in the lower part 1A or can be glued, screwed or riveted thereto. By way of example, the illustrated retaining part 1A in FIG. 3 is provided with an L-shaped angle having a short leg screwed to the lower part 1A. A long leg of the L-shaped angle of the retaining part 12A carries the pressure sensor 2. An annular elevation in which the pressure sensor 2 rests prevents slipping of the pressure sensor 2 from its position on the retaining part 12A.

The pressure sensor 2 is pressed against the retaining part 12A by an upper part 11A. The upper part 11A has a shape which is analogous to the upper part 11 of FIGS. 1 and 2, with the acception of a wall 111A. This wall 111A annularly surrounds the pressure connection 21 of the pressure sensor 2 and, together with the upper part 11A, forms a pressure space 112A which is sealed from the interior of the housing by a seal 143 annularly applied to the sensor housing. When the upper part 11A is put in place, the wall 111A is pressed into the sealing compound of the seal and, thus, simultaneously fixes the pressure sensor 2 on the retaining part 12A.

The present invention thereby provides a control device with a pressure sensor particularly for use in motor vehicles.

Although other modifications and changes may be suggested by those skilled in the art, it is the intention of the inventor to embody within the patent warranted hereon all changes and modifications as reasonably and properly come within the scope of his contribution to the art.

I claim:

1. A control device, comprising:
a housing having a lower part and an upper part, said housing having an interior which is pressure tight when said lower and upper parts are fixed together;
at least one contact at an inside of said lower part;
a printed circuit board secured inside and on a bottom of said lower part in a heat conducting manner;
an adjustable element secured on said printed circuit board;
a pressure sensor having a pressure connection and an electrical terminal; and
a retaining part fixing said pressure sensor in said lower part at a distance from said printed circuit board, said retaining part giving access to said adjustable element,
said upper part of said housing closing access to said adjustable element when fixed to said lower part after adjustment of said adjustable element.

2. A control device as claimed in claim 1, wherein said retaining part includes;
an upwardly arched portion for accepting said pressure sensor, said upwardly arched portion having an opening toward said circuit board and having a clearance for said pressure connection of said pressure sensor; and
a retaining member holding said pressure sensor in said upwardly arched portion.

3. A control device as claimed in claim 2, wherein said upper part and said retaining part define a pressure space into which discharges a connection from outside said control device and into which discharges said pressure connection of said pressure sensor from the inside, said pressure space being limited by outside walls of said upwardly arched portion and by walls of said upper part; and further comprising: a seal provided in a channel in said retaining part surrounding said upwardly arched portion for said pressure sensor and said walls in said upper part projecting into said seal.

4. A control device as claimed in claim 3, wherein said lower part includes seating webs o which said retaining part rests.

5. A control device as claimed in claim 4, further comprising:
guide means extending between said pressure sensor and said retaining part and between said retaining part and said lower part, said guide means fixing said pressure sensor and said retaining part and said lower part in position relative to one another.

6. A control device, comprising:
a housing having first and second housing parts connectable together to form a vacuum tight housing;
a printed circuit board mounted within said housing;
an adjustable circuit element mounted on said printer circuit board;
a pressure sensor having a pressure inlet mounted within said housing;
means for defining a pressure chamber in communication with said pressure inlet of said pressure sensor;
a retaining part in said housing mounted to secure said pressure sensor in a position spaced from said printed circuit board, said retaining part being of a shape to provide access to said adjustable circuit element on said printed circuit board when said second housing part is not connected to said first housing part; and
said first and second housing parts preventing access to said adjustable circuit element when said first housing part is connected to said second housing part.

* * * * *